US011446122B2

(12) United States Patent
Vergoullis et al.

(10) Patent No.: US 11,446,122 B2
(45) Date of Patent: Sep. 20, 2022

(54) DENTAL ABUTMENT CORE AND METHOD FOR MANUFACTURING A DENTAL ABUTMENT

(71) Applicant: VP INNOVATO HOLDINGS LTD., Lemessos (CY)

(72) Inventors: Ioannis Vergoullis, Rhodes (GR); Georgios Papadopoulos, Rhodes (GR)

(73) Assignee: VP INNOVATO HOLDINGS LTD., Lemessos (CY)

( * ) Notice: Subject to any disclaimer, the term of this patent is extended or adjusted under 35 U.S.C. 154(b) by 277 days.

(21) Appl. No.: 16/626,852

(22) PCT Filed: Jul. 26, 2018

(86) PCT No.: PCT/IB2018/055593
§ 371 (c)(1),
(2) Date: Dec. 26, 2019

(87) PCT Pub. No.: WO2019/038610
PCT Pub. Date: Feb. 28, 2019

(65) Prior Publication Data
US 2020/0222155 A1    Jul. 16, 2020

(30) Foreign Application Priority Data
Aug. 21, 2017   (GR) .............................. 20170100383

(51) Int. Cl.
*A61C 8/00*    (2006.01)
*A61C 13/20*    (2006.01)

(52) U.S. Cl.
CPC ............ *A61C 8/0077* (2013.01); *A61C 8/006* (2013.01); *A61C 13/20* (2013.01)

(58) Field of Classification Search
CPC ....... A61C 8/0077; A61C 8/006; A61C 8/008; A61C 13/20
See application file for complete search history.

(56) References Cited

U.S. PATENT DOCUMENTS

| 512,840 A | 1/1894 | Phelps |
| 5,180,303 A | 1/1993 | Hornburg et al. |

(Continued)

FOREIGN PATENT DOCUMENTS

| EP | 2343025 A2 | 7/2011 |
| EP | 2462893 A1 | 6/2012 |

(Continued)

OTHER PUBLICATIONS

KR101495480B1 Translation; downloaded from STIC (Mar. 6, 2022); Publication Date Mar. 25, 2015 (Year: 2015).*

(Continued)

*Primary Examiner* — Nicholas D Lucchesi
(74) *Attorney, Agent, or Firm* — Steinfl + Bruno, LLP (57) ABSTRACT

A dental abutment core with a prosthetic connection, a pillar and a shoulder located between the prosthetic connection and the pillar. The pillar has anti-rotational elements for preventing a custom body from rotating with respect to the dental abutment core. The pillar has a first portion adjacent to the shoulder, a second portion adjacent to the first portion, and a third portion farthest from the shoulder. A cross section of at least part of the first portion is circular and has an outer diameter which is lower than a cross section dimension of the second portion. The anti-rotational elements are located in the third portion. A method for manufacturing a dental abutment with such dental abutment core is also described.

16 Claims, 4 Drawing Sheets

(56) References Cited

U.S. PATENT DOCUMENTS

| | | |
|---|---|---|
| 5,183,053 A | 2/1993 | Yeh et al. |
| 5,338,196 A | 8/1994 | Beaty et al. |
| 5,492,471 A | 2/1996 | Singer |
| 5,499,918 A | 3/1996 | Morgan et al. |
| 5,759,036 A | 6/1998 | Hinds |
| 5,846,079 A | 12/1998 | Knode |
| 5,984,682 A | 11/1999 | Carlson |
| 6,386,876 B1 | 5/2002 | Lee |
| 6,672,871 B2 | 1/2004 | Hurson |
| 7,922,488 B2 | 4/2011 | Falk et al. |
| 8,628,327 B1 | 1/2014 | Blaisdell et al. |
| 9,572,640 B2 | 2/2017 | Blaisdell et al. |
| 9,895,209 B2 | 2/2018 | Blaisdell et al. |
| 10,136,974 B2 | 11/2018 | Vergoullis et al. |
| 10,420,632 B2 | 9/2019 | Vergoullis et al. |
| 11,116,613 B2 | 9/2021 | Vergoullis et al. |
| 2002/0106610 A1 | 8/2002 | Hurson |
| 2003/0211445 A1 | 11/2003 | Klardie et al. |
| 2006/0019219 A1 | 1/2006 | Saliger et al. |
| 2008/0176186 A1 | 7/2008 | Schaub |
| 2010/0105009 A1 | 4/2010 | Karkar et al. |
| 2010/0196849 A1 | 8/2010 | Moneim et al. |
| 2011/0020768 A1 | 1/2011 | Spagnoli et al. |
| 2011/0129798 A1 | 6/2011 | Zucker et al. |
| 2011/0200968 A1 | 8/2011 | Laizure, Jr. |
| 2012/0264081 A1 | 10/2012 | Philibin |
| 2012/0295223 A1 | 11/2012 | Robb et al. |
| 2013/0177872 A1 | 7/2013 | Blaisdell et al. |
| 2013/0196290 A1 | 8/2013 | Herrington et al. |
| 2013/0203015 A1 | 8/2013 | Falco |
| 2014/0080095 A1 | 3/2014 | Suttin et al. |
| 2014/0100327 A1 | 4/2014 | Yamaguchi et al. |
| 2014/0100642 A1 | 4/2014 | Mashiach |
| 2014/0124969 A1 | 5/2014 | Blaisdell et al. |
| 2014/0178835 A1 | 6/2014 | Lin |
| 2014/0193775 A1 | 7/2014 | Hogan et al. |
| 2014/0319713 A1 | 10/2014 | Blaisdell et al. |
| 2015/0100090 A1 | 4/2015 | Burke |
| 2015/0157424 A1 | 6/2015 | Zadeh |
| 2015/0173862 A1 | 6/2015 | Suttin et al. |
| 2015/0351875 A1 | 12/2015 | Mielecke |
| 2015/0351877 A1 | 12/2015 | Boehm et al. |
| 2015/0366641 A1 | 12/2015 | Malinin et al. |
| 2017/0007372 A1 | 1/2017 | Blaisdell et al. |
| 2017/0128176 A1 | 5/2017 | Vergoullis et al. |
| 2017/0172714 A1 | 6/2017 | Blaisdell et al. |
| 2018/0028283 A1 | 2/2018 | Lin et al. |
| 2018/0042736 A1 | 2/2018 | Wahl |
| 2018/0161134 A1 | 6/2018 | Liston et al. |
| 2018/0325630 A1 | 11/2018 | Leger et al. |
| 2019/0029786 A1 | 1/2019 | Vergoullis et al. |
| 2019/0201167 A1 | 7/2019 | Vergoullis et al. |
| 2019/0282343 A1 | 9/2019 | Pfeiffer et al. |
| 2019/0357998 A1 | 11/2019 | Vergoullis et al. |
| 2020/0237483 A1 | 7/2020 | Vergoullis et al. |
| 2021/0236244 A1 | 8/2021 | Vergoullis et al. |

FOREIGN PATENT DOCUMENTS

| | | | |
|---|---|---|---|
| FR | 3027792 A1 | 5/2016 | |
| FR | 3031667 A1 | 7/2016 | |
| GB | 2502328 A | 11/2013 | |
| GR | 20140100642 A | 7/2016 | |
| GR | 20150100111 A | 10/2016 | |
| JP | H08196549 A | 8/1996 | |
| JP | 2010246762 A | 11/2010 | |
| KR | 20100048968 A | 5/2010 | |
| KR | 101419519 B1 | 8/2014 | |
| KR | 101446064 B1 | 10/2014 | |
| KR | 1495480 B1 * | 3/2015 | |
| KR | 20160006385 A | 1/2016 | |
| KR | 101734706 B1 | 5/2017 | |
| MX | 2010004033 A | 10/2011 | |
| WO | 95/03007 A1 | 2/1995 | |
| WO | 2013/041382 A1 | 3/2013 | |
| WO | 2014/111413 A1 | 7/2014 | |
| WO | WO-2014111413 A1 * | 7/2014 | ............ A61C 8/005 |
| WO | 2015/189647 A1 | 12/2015 | |
| WO | 2015/189648 A2 | 12/2015 | |
| WO | WO-2015189647 A1 * | 12/2015 | ........... A61C 13/206 |
| WO | 2017/029670 A1 | 2/2017 | |
| WO | 2017/072066 A1 | 5/2017 | |
| WO | 2017/221097 A1 | 12/2017 | |
| WO | 2018/015562 A1 | 1/2018 | |
| WO | 2018/065984 A1 | 4/2018 | |
| WO | 2018/107121 A2 | 6/2018 | |
| WO | 2019/038610 A1 | 2/2019 | |
| WO | 2020/044302 A1 | 3/2020 | |

OTHER PUBLICATIONS

Greek Search Report for Greek Application GR20190100040 filed on Jan. 24, 2019 on behalf of VP Innovato Holdings Ltd. dated Oct. 4, 2019. 1 Page. Greek Only.

International Preliminary Report on Patentability for International PCT App. No. PCT/IB2019/057325 filed on Aug. 30, 2019, on behalf of VP Innovato Holdings Ltd. dated Dec. 2, 2020. 19 Pages.

International Search Report for International PCT App. No. PCT/IB2019/057325 filed on Aug. 30, 2019, on behalf of VP Innovato Holdings Ltd. dated Nov. 28, 2019. 5 Pages.

Non-Final Office Action for U.S. Appl. No. 16/146,457, filed Sep. 28, 2018 on behalf of VP Innovato Holdings Ltd. dated Apr. 21, 2021. 17 Pages.

Notice of Allowance for U.S. Appl. No. 16/146,457, filed Sep. 28, 2018 on behalf of VP Innovato Holdings Ltd. dated Jun. 23, 2021. 11 Pages.

Restriction Requirement for U.S. Appl. No. 16/146,457, filed Sep. 28, 2018 on behalf of VP Innovato Holdings Ltd. dated Nov. 6, 2020. 10 Pages.

Written Opinion for International PCT App. No. PCT/IB2019/057325 filed on Aug. 30, 2019, on behalf of VP Innovato Holdings Ltd. dated Nov. 28, 2019. 8 Pages.

Boynuegri et al. "Effect of different localizations of microgap on clinical parameters and inflammatory cytokines in peri-implant crevicular fluid: A prospective comparative study" Clinical Oral Investigations; 2012; 16 (2):pp. 353-361.

Chu et al. "Managing esthetic challenges with anterior implants. Part 1: midfacial recession defects from etiology to resolution" Compendium of Continuing Education in Dentistry; Oct. 2013; vol. 34, Special Issue 7; pp. 26-31.

Chu et al. "The dual-zone therapeutic concept of managing immediate implant placement and provisional restoration in anterior extraction sockets" Compendium of Continuing Education in Dentistry; Aug. 2012; vol. 33, No. 7; pp. 524-534.

Ex Parte Quayle Action for U.S. Appl. No. 16/311,651, filed Dec. 19, 2018, on behalf of VP Innovato Holdings Ltd. dated May 29, 2019. 10 Pages. .

International Preliminary Report on Patentability for PCT Application No. PCT/GR2015/000029, filed on Jun. 12, 2015, on behalf of Vergoullis, Ioannis. dated Dec. 6, 2016. 66 pgs.

International Preliminary Report on Patentability for PCT/IB2017/053419, filed on Jun. 9, 2017, on behalf of VP Innovato Holdings Ltd. dated Sep. 6, 2018. 20 pages.

International Search Report for International Application No. PCT/GR2015/000029, filed on Jun. 12, 2015, on behalf of Vergoullis, Ioannis. dated Oct. 5, 2015. 3 pgs.

International Search Report for PCT/IB/2018/055593 filed on Jul. 26, 2018 on behalf of VP Innovato Holdings Ltd. dated Oct. 23, 2018. 6 pages.

International Search Report for PCT/IB2017/053419, filed on Jun. 9, 2017, on behalf of VP Innovato Holdings Ltd. dated Aug. 17, 2017. 5 pages.

Non-Final Office Action for U.S. Appl. No. 15/318,085, filed Dec. 12, 2016, on behalf of Ioannis Vergoullis. dated Apr. 18, 2018. 17 pgs.

Notice of Allowance for U.S. Appl. No. 15/318,085, filed Dec. 12, 2016, on behalf of GP Innovato Cyprus Ltd, Limassol, Cyprus. dated Aug. 27, 2018. 5 pgs.

(56) References Cited

OTHER PUBLICATIONS

Notice of Allowance for U.S. Appl. No. 16/311,651, filed Dec. 19, 2018, on behalf of VP Innovato Holdings Ltd. dated Jul. 15, 2019. 5 Pages.
Written Opinion for International Application No. PCT/GR2015/000029, filed Jun. 12, 2015, on behalf of Ioannis Gergoullis. dated Oct. 5, 2015. 5 pgs.
Written Opinion for PCT/IB/2018/055593 filed on Jul. 26, 2018 on behalf of VP Innovato Holdings Ltd. dated Oct. 23, 2018. 7 pages.
Written Opinion for PCT/IB2017/053419, filed on Jun. 9, 2017, on behalf of VP Innovato Holdings Ltd. dated Aug. 17, 2017. 9 pages.
Non-Final Office Action for U.S. Appl. No. 16/538,269, filed Aug. 12, 2019, on behalf of VP Innovato Holdings Ltd. dated Oct. 6, 2021. 15 Pages.
Non-Final Office Action for U.S. Appl. No. 16/726,009, filed Dec. 23, 2019, on behalf of VP Innovato Holdings Ltd. dated Mar. 2, 2022. 21 Pages.
Non-Final Office Action for U.S. Appl. No. 16/726,009, filed Dec. 23, 2019, on behalf of VP Innovato Holdings Ltd. dated Nov. 9, 2021. 25 Pages.

\* cited by examiner

DENTAL ABUTMENT CORE AND METHOD FOR MANUFACTURING A DENTAL ABUTMENT

CROSS REFERENCE TO RELATED APPLICATIONS

The present application is the U.S. national stage of International Patent Application PCT/IB2018/055593 filed internationally on Jul. 26, 2018, which, in turn, claims priority to Greek Patent Application No. 20170100383 filed on Aug. 21, 2017.

TECHNICAL FIELD

This invention belongs to the field of tools used by dentists for operating in dental tissue, in order to place implants or similar operations.

STATE OF THE ART

Dental abutments usually comprise a core and a custom body. The core has the means for attaching the dental abutment to an implant placed in the patient's jaw, while the custom body has the suitable shape of the subgingival, cervical and supra-gingival portion of the dental piece which is to be inserted.

The core usually comprises a prosthetic connection, a shoulder and a pillar. The prosthetic connection is intended to be attached to a corresponding connecting piece located in the implant present in the patient's jaw. The shoulder is a cylindrical section of variable cross section, located between the prosthetic connection and the pillar, and which has an equal or greater diameter near the pillar than near the prosthetic connection. The pillar is the part of the core where the custom body is intended to be fixed.

The term "dental abutment" refers to abutments that can be used for supporting implant prostheses but also to healing abutments used for soft tissue sculpting around implants during the phase of peri-implant soft tissue maturation and adaptation.

Anti-rotational means are known, to prevent the custom body from rotating with respect to the core. This is convenient, since the custom body is designed to be in a predetermined position, and if this custom body rotates with respect to the core, the position ceases to be optimal.

However, these anti-rotational means have a shape so that the custom body is fixed before installing the whole dental abutment to the implant in the patient's mouth. This sometimes leads to positioning errors and require a correction, but this correction cannot be made, since the custom body is fixed due to the anti-rotational means.

A solution for this problem is sought.

DESCRIPTION OF THE INVENTION

The invention provides a solution for this problem by means of a dental abutment core according to claim 1, a method for manufacturing a dental abutment according to claim 8 and a dental tool system according to claim 14. Preferred embodiments of the invention are defined in dependent claims.

In a first inventive aspect, the invention provides a dental abutment core for being used in an abutment for forming the gingival tissue around implants. This dental abutment core comprises
a prosthetic connection;
a pillar comprising anti-rotational means for preventing a custom body from rotating with respect to the dental abutment core; and
a shoulder located between the prosthetic connection and the pillar, the shoulder being intended to be in contact with gingival tissue and comprising a first base adjacent to the prosthetic connection and a second base equal or greater than the first base adjacent to the pillar;
a core axis perpendicular to the first base and the second base;
wherein
the pillar comprises a first portion adjacent to the shoulder, a second portion adjacent to the first portion, and a third portion farthest from the shoulder, wherein a cross section of at least part of the first portion being circular and having an outer diameter which is lower than a cross section dimension of the second portion, and wherein the anti-rotational means are comprised in the third portion.

This dental abutment core is advantageously adapted to provide coupling for a custom body in such a way that a custom body coupled to the first portion of the pillar may rotate around the dental abutment core but may not exit it. This is useful for a dental practitioner who may want to rotate the custom body until reaching the optimal orientation, and then apply some biocompatible material so that the custom body is fixed by the anti-rotational means.

The second portion does not need to be circular, so the outer diameter of the first portion is compared with a cross section dimension of the second portion. This cross section dimension is an equivalent to the outer diameter: is the distance between two points belonging to the outer surface of this second portion.

In some particular embodiments, the second portion further comprises a protrusion.

This protrusion in the second portion is suitable for a cap to rest on it. This provides a singular advantage: a cap may rest on a point which is upper than the first portion, so that a biocompatible material poured on a cap according to these particular embodiments will reach the first portion of the pillar but will not reach the second and third portion of the pillar.

In some embodiments, this protrusion also allows the abutment core to have a third portion with a cross section of diameter similar or smaller than the first portion, since the abutment is comprised in the second portion. This could be beneficial in some cases where more room for the custom body is required during manufacturing process, or a thicker custom body is required for higher durability. In some particular embodiments, the cross section of the pillar is smaller, equal, or larger than the cross section of area.

In some particular embodiments, the protrusion is an annular protrusion. A complete circumferential protrusion is not needed, but is preferred, thus providing a complete support for the cap.

In some particular embodiments, the protrusion is located adjacent to the first portion of the pillar. In these embodiments, the whole second portion and third portion are covered by the cap when it rests on the protrusion, thus avoiding biocompatible material to reach them in the manufacturing process.

In some particular embodiments, the first portion comprises a first sub-portion adjacent to the shoulder and a second sub-portion with a circular and lower cross section than the cross section of the first sub-portion.

This feature has the advantage of allowing a precise limitation of the second sub-portion, which may or may not reach the shoulder, depending on further requirements of the practitioner.

In some particular embodiments, the anti-rotational means comprises at least a slot and a protrusion oriented according to the core axis. This is an advantageous way of achieving this anti-rotation effect.

In some particular embodiments, the prosthetic connection and the shoulder base have an axis which is not parallel to the core axis. These embodiments provide a better adaptive abutment cores to the patient's needs.

In a second inventive aspect, the invention provides a method of manufacturing a dental abutment comprising the steps of
- providing a dental abutment core according to the first inventive aspect;
- placing a cap covering the second portion and the third portion of the pillar;
- providing a biocompatible material so that the biocompatible material reaches the first portion of the pillar, but does not reach the second portion and the third portion of the pillar due to the interposition of the cap, so that the biocompatible material becomes a custom body;
- removing the cap, so that the second portion and the third portion of the pillar is surrounded by a space absent of custom body;
- providing a material covering the space so that the custom body is fixed to the pillar.

This method allows manufacturing a dental abutment with a custom body which may rotate with respect to the dental abutment core, but without exiting it. This is useful when a dental practitioner needs to adjust the orientation of the custom body when the abutment core is fixed.

In some particular embodiments, the dental abutment core is provided in a moulding apparatus, and the provision of biocompatible material is performed by pouring this biocompatible material in a fluid state in the moulding apparatus, and further curing the biocompatible material so that it becomes the custom body.

This is an easy and inexpensive way of carrying out this method.

In some particular embodiments, the method further comprises the step of applying a lubricant agent on the first portion of the pillar before pouring the biocompatible material.

This lubricant agent will ease the rotation movement of the custom body around the abutment core.

In some particular embodiments, the cap rests on a protrusion of the second portion of the pillar when it is placed covering the third portion of the pillar.

This protrusion serves as a barrier so that the biocompatible material does not reach the second and third portions of the pillar.

In some particular embodiments, the method further comprises the step of rotating the custom body until it reaches an optimal position before providing the material for covering the space.

When the correct orientation is achieved, the dental practitioner may fill de gap between the custom body and the core pillar and fix the position of the custom body by means of the anti-rotational means.

In some particular embodiments, the step of rotating the custom body is carried out inside a patient's mouth or in a working dental cast.

These particular embodiments are aimed for a more accurate result, since the operations are done taking as a reference the real position of the rest of dental pieces.

In a further inventive aspect, the invention provides a dental tools system suitable for carrying out the steps of a method according the previous inventive aspect, the dental tools system comprising
- a dental abutment core according to the first inventive aspect;
- a cap suitable for covering the second portion and the third portion of the pillar;
- a custom body coupled to the first portion of the pillar of the dental abutment core.

In some particular embodiments, the custom body has a shape that is generally triangular, or parallelogram, or rectangular, or ovoid, or circular.

These shapes are particularly advantageous, since they adapt to the shape of a great variety of patient's teeth.

BRIEF DESCRIPTION OF THE DRAWINGS

To complete the description and in order to provide for a better understanding of the invention, a set of drawings is provided. Said drawings form an integral part of the description and illustrate an embodiment of the invention, which should not be interpreted as restricting the scope of the invention, but just as an example of how the invention can be carried out. The drawings comprise the following figures.

DETAILED DESCRIPTION OF THE INVENTION

Figure 1:
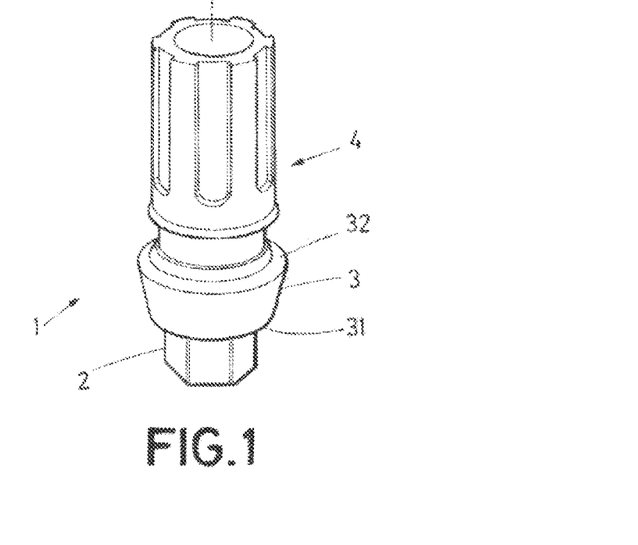
FIG. 1 shows a view of a dental abutment core according to the invention.

FIG. 1 shows a general view of an embodiment of a dental abutment core according to the invention.

This dental abutment core 1 comprises a prosthetic connection 2, a pillar 4, a shoulder 3 and a core axis 10.

The shoulder 3 is located between the prosthetic connection 2 and the pillar 4, and comprises a first base 31 adjacent to the prosthetic connection 2 and a second base 32 greater than the first base 31 adjacent to the pillar 4. The core axis 10 is in turn perpendicular to the first base 31 and the second base 32.

This dental abutment core 1 is for being used in an abutment for forming the gingival tissue around implants.

Figure 2:
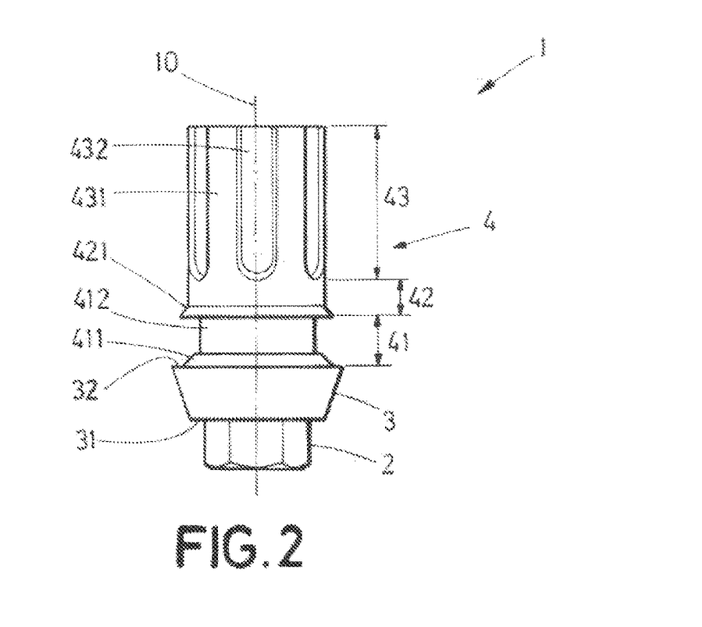
FIG. 2 shows a detailed front view of a dental abutment core according to the invention.

FIG. 2 shows a detailed front view of the dental abutment core shown in the previous figure.

The pillar 4 comprises anti-rotational means 431, 432 for preventing a custom body from rotating with respect to the dental abutment core 1. The anti-rotational means comprises a plurality of slots 432 and protrusions 431, all of them being oriented according to the core axis 10. The aim of these anti-rotational means 431, 432 is preventing the dental abutment core 1 from rotating with respect to a custom body which may be adapted to it.

The pillar 4 comprises a first portion 41 adjacent to the shoulder 3, a second portion 42 adjacent to the first portion 41, and a third portion 43 farthest from the shoulder 3. The anti-rotational means 431, 432 are located in said third portion 43 of the pillar 4.

Each portion has a cross section surface, the cross section surface of the first portion 41 is circular and has an outer diameter which is lower than a cross section dimension of the second portion. The second portion does not need to be circular, so the outer diameter of the first portion is compared with a cross section dimension of the second portion. This cross section dimension is an equivalent to the outer diameter: is the distance between two points belonging to the outer surface of this second portion.

The first portion 41 comprises a first sub-portion 411 adjacent to the shoulder 3 and a second sub-portion 412 with a circular and lower cross section than the cross section of the first sub-portion 411.

The second portion 42 further comprises a circumferential protrusion 421.

This circumferential protrusion 421 is intended for a cap to rest on it. This provides a singular advantage: a cap may rest on a point which is upper than the first portion, so that a biocompatible material poured on a cap according to these particular embodiments will reach the first portion of the pillar but will not reach the second and third portion of the pillar.

FIGS. 3*a*-3*e* show some method steps of manufacturing a dental abutment according to the invention.

Figure 3A:
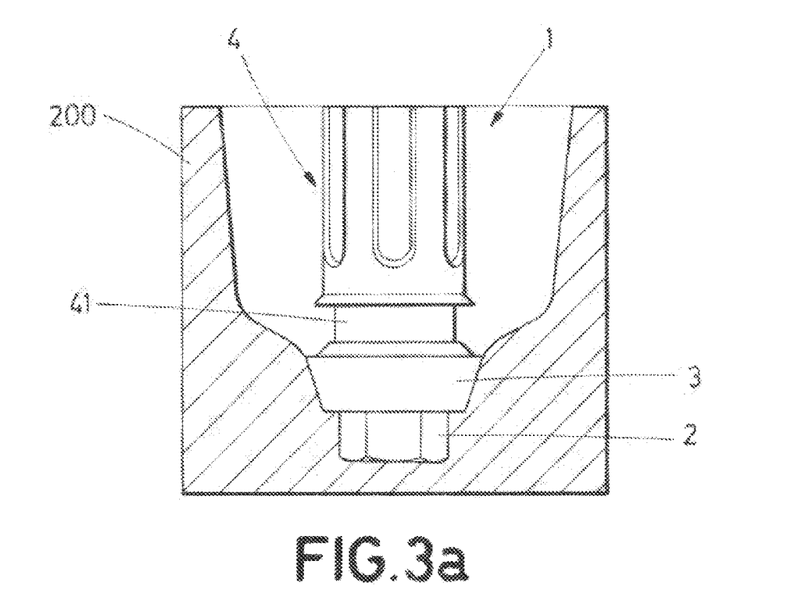
FIGS. 3a-3e show some method steps of manufacturing a dental abutment according to the invention.

FIG. 3*a* shows a first step of this method, where a dental abutment core 1, such as the one shown in the previous figures, is provided in a moulding apparatus 200. A lubricant agent is applied on the first portion 41 of the pillar 4.

Figure 3B:
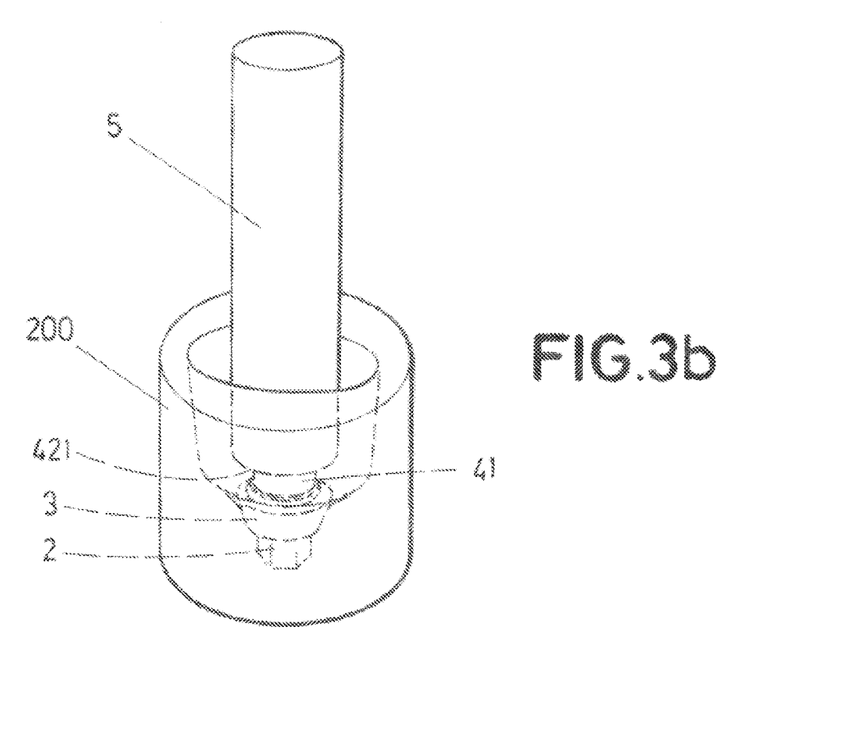

FIG. 3*b* shows a second step of this method, where a cap 5 is placed covering the second and third portion of the pillar (not seen). This cap 5 rests on the protrusion 421 of the second portion of the pillar.

Figure 3C:
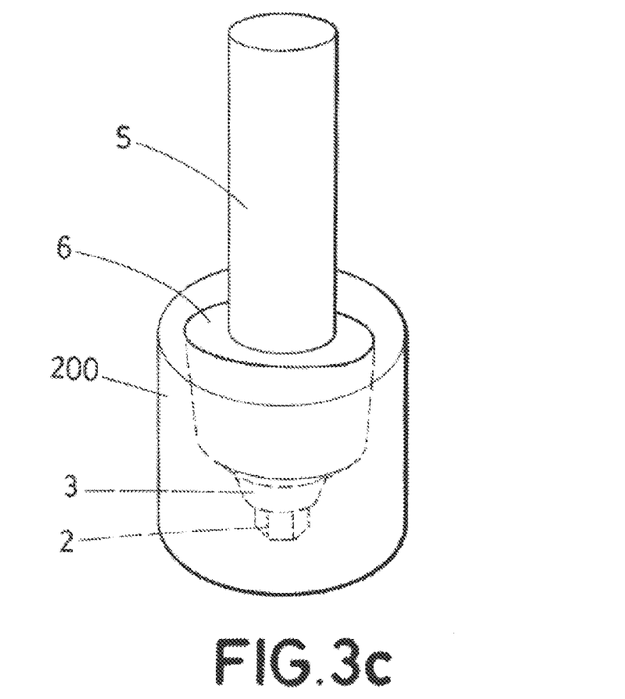

FIG. 3*c* shows a third step of this method, where a biocompatible material 6 is poured in a fluid state in the moulding apparatus 200, so that the biocompatible material reaches the first portion of the pillar, but does not reach the second portion or the third portion of the pillar due to the interposition of the cap 5. When the biocompatible material 6 is cured, it becomes a custom body.

Figure 3D:
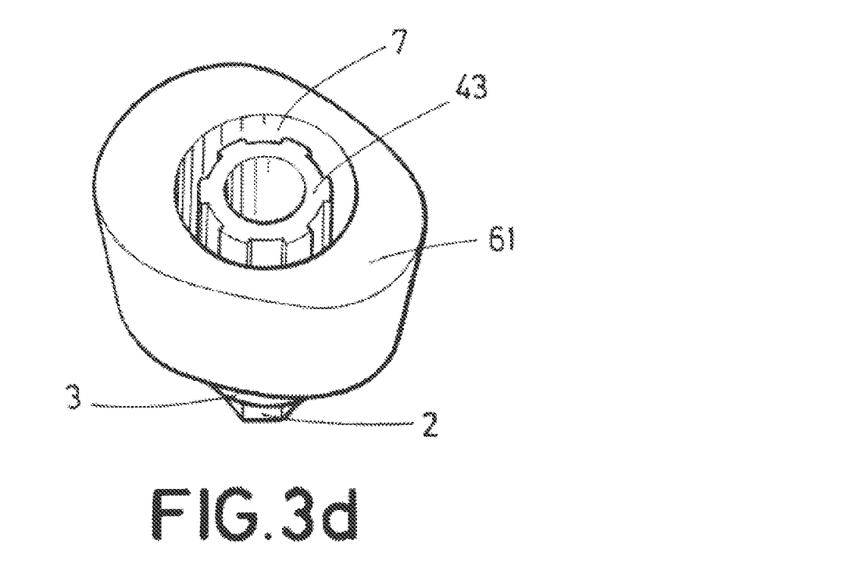

FIG. 3*d* shows a fourth step of this method, where the cap is removed, so that the third portion 43 of the pillar is surrounded by a space 7 absent of custom body 61.

This custom body 61 is able to rotate around the first portion of the pillar, due to the circular shape of this first portion and helped by the lubricant agent which had been applied in a previous stage.

However, thanks to the second portion, which has a greater cross-section than the first portion, the custom body 61 may not exit the pillar 4, being safely retained around it.

Figure 3E:
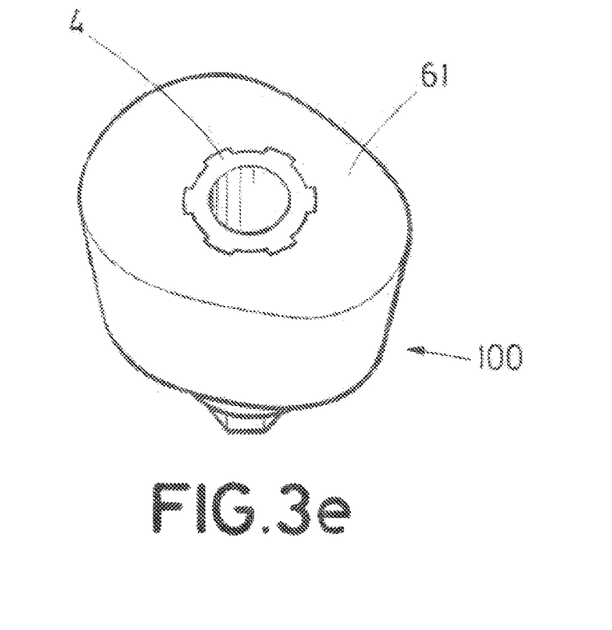

FIG. 3*e* shows a fifth step of this method. When the custom body 61 has been rotated to be placed in a correct orientation, a biocompatible material is provided covering the space so that the custom body 61 is fixed to the pillar 4 in the dental abutment 100.

Figure 4:
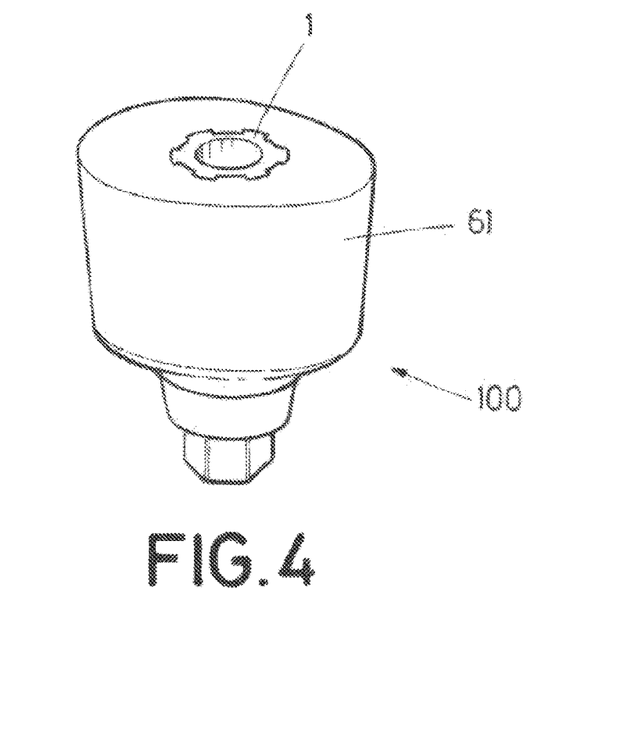
FIG. 4 shows a final dental abutment according to the invention.

FIG. 4 shows a final dental abutment 100 which has been manufactured according to a method described above. This dental abutment 100 comprises a dental abutment core 1 and a custom body 61. The custom body 61 may not rotate with respect to the dental abutment core 1 since the custom body 61 is now in connection with the anti-rotational means comprised in the dental abutment core 1.

In this text, the term "comprises" and its derivations such as "comprising", etc. should not be understood in an excluding sense, that is, these terms should not be interpreted as excluding the possibility that what is described and defined may include further elements, steps, etc.

The invention is obviously not limited to the specific embodiments described herein, but also encompasses any variations that may be considered by any person skilled in the art for example, as regards the choice of materials, dimensions, components, configuration, etc., within the general scope of the invention as defined in the claims.

The invention claimed is:

1. A dental abutment core for being used in an abutment for forming the gingival tissue around implants, the dental abutment core comprising:
   a prosthetic connection;
   a pillar comprising anti-rotational means for preventing a custom body from rotating with respect to the dental abutment core;
   a shoulder located between the prosthetic connection and the pillar, the shoulder being intended to be in contact with gingival tissue, wherein the shoulder comprises:
      a first base adjacent to the prosthetic connection and
      a second base having a cross section equal or greater than the first base; and
   a core axis perpendicular to the first base and the second base; wherein
   the pillar comprises a first portion adjacent to the shoulder, a second portion adjacent to the first portion, and a third portion farthest from the shoulder,
   a cross section of at least part of the first portion is circular and has an outer diameter which is smaller than a cross section dimension of the second portion,
   the second portion comprises a circumferential protrusion,
   a cross section dimension of the second portion is larger than a cross section dimension of the third portion,
   the anti-rotational means are comprised in the third portion, and
   the first portion comprises a first sub-portion adjacent to the shoulder and a second sub-portion with a circular and smaller cross section than the cross section of the first sub-portion.

2. The dental abutment core according to claim 1, wherein the protrusion is located adjacent to the first portion of the pillar.

3. The dental abutment core according to claim 1, wherein the anti-rotational means of the third portion of the pillar comprises at least a slot and a parallel protrusion oriented according to the core axis.

4. A method of manufacturing a dental abutment comprising the steps of providing the dental abutment core according to claim 1;
   placing a cap covering the second portion and the third portion of the pillar;
   providing a biocompatible material so that the biocompatible material reaches the first portion of the pillar, but does not reach the second portion and the third portion of the pillar due to the interposition of the cap, so that the biocompatible material becomes a custom body;
   removing the cap, so that the second portion and the third portion of the pillar is surrounded by a space absent of custom body; and
   providing a material covering the space so that the custom body is fixed to the pillar.

5. The method according to claim 4, wherein the dental abutment core is provided in a moulding apparatus, and the provision of biocompatible material is performed by pouring this biocompatible material in a fluid state in the moulding apparatus, and further curing the biocompatible material so that the biocompatible material becomes the custom body.

6. The method according to claim 4, further comprising the step of applying a lubricant agent on the first portion of the pillar before pouring the biocompatible material.

7. The method according to claim 4, wherein the cap rests on a protrusion of the second portion of the pillar when it is placed covering the third portion of the pillar.

8. The method according to claim 4, further comprising the step of rotating the custom body until it reaches an optimal position before providing the material for covering the space.

9. The method according to claim 8, wherein the step of rotating the custom body is carried out inside a patient's mouth or in a working dental cast.

10. A dental tools system suitable for performing a method for manufacturing a dental abutment, the dental tools system comprising
the dental abutment core according to claim 1;
a cap suitable for covering the second portion and the third portion of the pillar; and
a custom body coupled to the first portion of the pillar of the dental abutment core.

11. The dental tools system according to claim 10, wherein the custom body has a shape that is generally triangular, or parallelogram, or rectangular, or ovoid, or circular.

12. The dental abutment core according to claim 1, further comprising a cap configured to cover over both the second portion and the third portion of the pillar.

13. The dental abutment core according to claim 12, wherein the cap is configured to rest on the circumferential protrusion of the second portion of the pillar when covering over the second portion and the third portion of the pillar.

14. The dental abutment core according to claim 1, further comprising a moulding apparatus configured to fit around the prostetic connection and the shoulder of the pillar.

15. The dental abutment core according to claim 14, wherein the moulding apparatus is configured to couple to the pillar at the prosthetic connector and the shoulder of the pillar.

16. A dental abutment core comprising:
a prosthetic connection;
a pillar comprising:
　a shoulder;
　a first portion adjacent to the shoulder;
　a second portion adjacent to the first portion; and
　a third portion farthest from the shoulder,
　　wherein the shoulder comprises
　　　a first base adjacent to the prosthetic connection; and
　　　a second base having a cross section dimension equal or greater than the first base,
　　wherein the first portion comprises
　　　a first sub-portion and
　　　a second sub-portion in which the first sub-portion of the first portion is circular and has an outer diameter which is smaller than a cross section dimension of the second portion,
　　wherein the second portion comprises a circumferential protrusion having a cross section dimension larger than a cross section dimension of the third portion,
　　wherein the third portion comprises an anti-rotational means, and
　　wherein the second sub-portion of the first portion has a cross section which is smaller than the cross section of the first sub-portion of the first portion;
a cap configured to rest on the circumferential protrusion of the second portion of the pillar when covering over the second portion and the third portion of the pillar; and
a moulding apparatus configured to couple to the pillar at the prosthetic connector and the shoulder of the pillar.

* * * * *